(12) United States Patent
Mazzarese et al.

(10) Patent No.: US 8,634,867 B2
(45) Date of Patent: Jan. 21, 2014

(54) APPARATUS AND METHOD FOR TRANSMITTING AND RECEIVING SIGNAL AND SUBCARRIER ALLOCATION STRUCTURE THEREFOR IN A MULTI-USER MULTI-ANTENNA COMMUNICATION SYSTEM

(75) Inventors: David Mazzarese, Suwon-si (KR); Hak-Ju Lee, Incheon (KR); Sung-Ryul Yun, Suwon-si (KR); Dong-Seek Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1373 days.

(21) Appl. No.: 11/985,325

(22) Filed: Nov. 14, 2007

(65) Prior Publication Data

US 2008/0167061 A1 Jul. 10, 2008

(30) Foreign Application Priority Data

Nov. 14, 2006 (KR) .................. 10-2006-0112061

(51) Int. Cl.
*H04M 1/00* (2006.01)

(52) U.S. Cl.
USPC ............. 455/550.1; 455/500; 455/556.1; 455/575.7; 455/69; 455/70; 370/299; 370/219; 370/220; 370/349

(58) Field of Classification Search
USPC ............. 455/500, 550.1, 561, 575.7, 69–70; 370/141, 142, 144, 146, 147, 148, 219, 370/220, 299, 349
See application file for complete search history.

(56) References Cited

U.S. PATENT DOCUMENTS

| | | | |
|---|---|---|---|
| 6,192,256 B1 * | 2/2001 | Whinnett | 455/562.1 |
| 7,248,645 B2 | 7/2007 | Vialle et al. | |
| 2006/0268623 A1 | 11/2006 | Chae et al. | |
| 2008/0076370 A1 * | 3/2008 | Kotecha et al. | 455/187.1 |
| 2009/0316307 A1 * | 12/2009 | Olesen et al. | 360/267 |

FOREIGN PATENT DOCUMENTS

| | | |
|---|---|---|
| KR | 1020040102192 A | 12/2004 |
| KR | 1020060097519 A | 9/2006 |
| WO | WO 03/094386 A1 | 11/2003 |

* cited by examiner

*Primary Examiner* — Fayyaz Alam (57) ABSTRACT

An apparatus and method for transmitting and receiving a signal and a subcarrier allocation structure therefor in a multi-user multi-antenna communication system are provided, in which a transmitter calculates receive filters for each of a plurality of receivers or for a plurality of antennas in a receiver, determines the index of a vector having a correlation with the calculated receive filters in a preset codebook vector to be a receive filter index, and transmits the receive filter index to the receiver.

26 Claims, 8 Drawing Sheets

1 SUB-CHANNEL = 5 DISTRIBUTED TILES

ALLOCATE MS 2,3,4,5

▓ PILOT SUBCARRIERS ALLOCATED TO MS 1
▨ DATA SUBCARRIERS ALLOCATED TO MS 1
▦ DATA SUBCARRIERS ALLOCATED TO MS 2
▩ DATA SUBCARRIERS ALLOCATED TO MS 3
▥ DATA SUBCARRIERS ALLOCATED TO MS 4
▤ DATA SUBCARRIERS ALLOCATED TO MS 5
☐ SUBCARRIERS WITH COMMON PILOTS

FIG.4A
FIG.4B

PILOT SUBCARRIERS ALLOCATED TO MS 1
DATA SUBCARRIERS ALLOCATED TO MS 1
DATA SUBCARRIERS ALLOCATED TO MS 2
DATA SUBCARRIERS ALLOCATED TO MS 3
DATA SUBCARRIERS ALLOCATED TO MS 4
DATA SUBCARRIERS ALLOCATED TO MS 5
SUBCARRIERS WITH COMMON PILOTS

FIG.5A FIG.5B

1 SUB-CHANNEL = 5 DISTRIBUTED TILES

ALLOCATE MS 2,3,4,5

▦ PILOT SUBCARRIERS ALLOCATED TO MS 1
▨ DATA SUBCARRIERS ALLOCATED TO MS 1
▨ DATA SUBCARRIERS ALLOCATED TO MS 2
▨ DATA SUBCARRIERS ALLOCATED TO MS 3
▨ DATA SUBCARRIERS ALLOCATED TO MS 4
▨ DATA SUBCARRIERS ALLOCATED TO MS 5
☐ SUBCARRIERS WITH COMMON PILOTS

FIG.6A

FREQUENCY (SUBCARRIERS)

TIME(OFDM SYMBOLS)

FIG.6A

FREQUENCY (SUBCARRIERS)

TIME(OFDM SYMBOLS)

▓ PILOT SUBCARRIERS ALLOCATED TO MS 1

▒ SUBCARRIERS WITH COMMON PILOTS

▓ DATA SUBCARRIERS ALLOCATED TO MS 1 AND MS 2

FIG.7A

FREQUENCY (SUBCARRIERS)

TIME(OFDM SYMBOLS)

FIG.7A

FREQUENCY (SUBCARRIERS)

TIME(OFDM SYMBOLS)

▓ PILOT SUBCARRIERS ALLOCATED TO MS 1

▒ SUBCARRIERS WITH COMMON PILOTS

▓ DATA SUBCARRIERS ALLOCATED TO MS 1 AND MS 2

FIG.8

APPARATUS AND METHOD FOR TRANSMITTING AND RECEIVING SIGNAL AND SUBCARRIER ALLOCATION STRUCTURE THEREFOR IN A MULTI-USER MULTI-ANTENNA COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 14, 2006 and assigned Serial No. 2006-112061, the entire disclosure of which is hereby incorporated by reference.

TECHNICAL FIELD OF THE INVENTION

The present invention generally relates to an apparatus and method for transmitting and receiving a signal in a multi-antenna communication system.

BACKGROUND OF THE INVENTION

The term "receive filter" is used interchangeably with "reception beamforming coefficient" or "reception beamforming weight" in the same meaning.

Figure 1A:
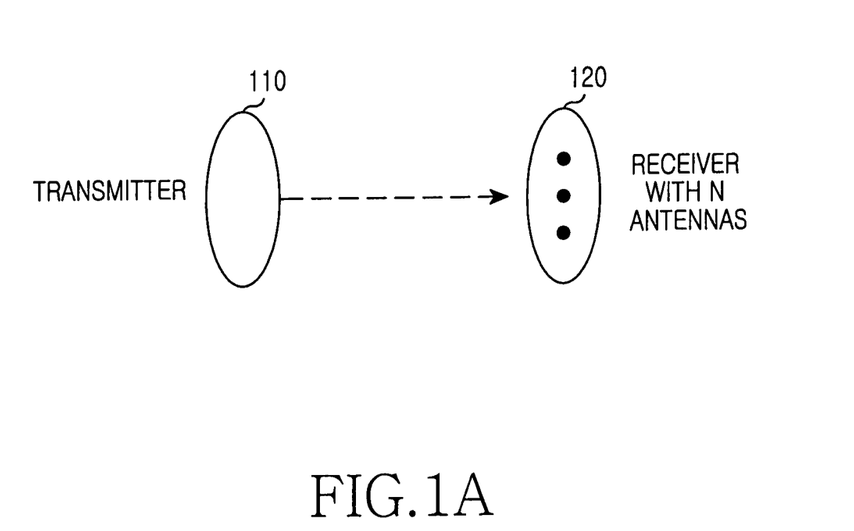
FIG. 1A illustrates a multi-antenna communication system having a transmitter with a plurality of transmit antennas and a receiver with a plurality of receive antennas.

FIG. 1A illustrates a multi-antenna communication system having a transmitter with a plurality of transmit antennas and a receiver with a plurality of receive antennas. Referring to FIG. 1A, a base station (BS) transmitter 110 communicates with a receiver 120 with a plurality of (N) antennas.

The multi-antenna communication system seeks to increase spectral efficiency by establishing multiple links between a transmitter and a single user.

The transmitter applies beamforming weights to data that the receiver will receive through a plurality of antennas. To allow the receiver to detect accurate data through channel estimation for the respective antennas, the transmitter should transmit pilot subcarriers to which beamforming weights are applied on dedicated channels to the antennas of the receiver.

However, in a communication system designed share downlink pilot subcarriers among the antennas of the receiver, beamforming weights cannot be applied to the pilot subcarriers. Since the antennas of the receiver have different beamforming weights, the common use of pilot subcarriers with one beamforming weight at the antennas leads to inaccurate data detection.

Accordingly, there exists a need for an apparatus and method for transmitting and receiving a signal that enable accurate detection of data received at the antennas of the receiver in the case where pilot subcarriers to which different beamforming weights are applied with respect to the antennas of the receiver cannot be transmitted on dedicated channels, that is, in a communication system designed to share downlink pilot subcarriers among the antennas of the receiver. Also, there is a need for a subcarrier allocation structure that suits the transmission and reception apparatus and method.

Figure 1B:
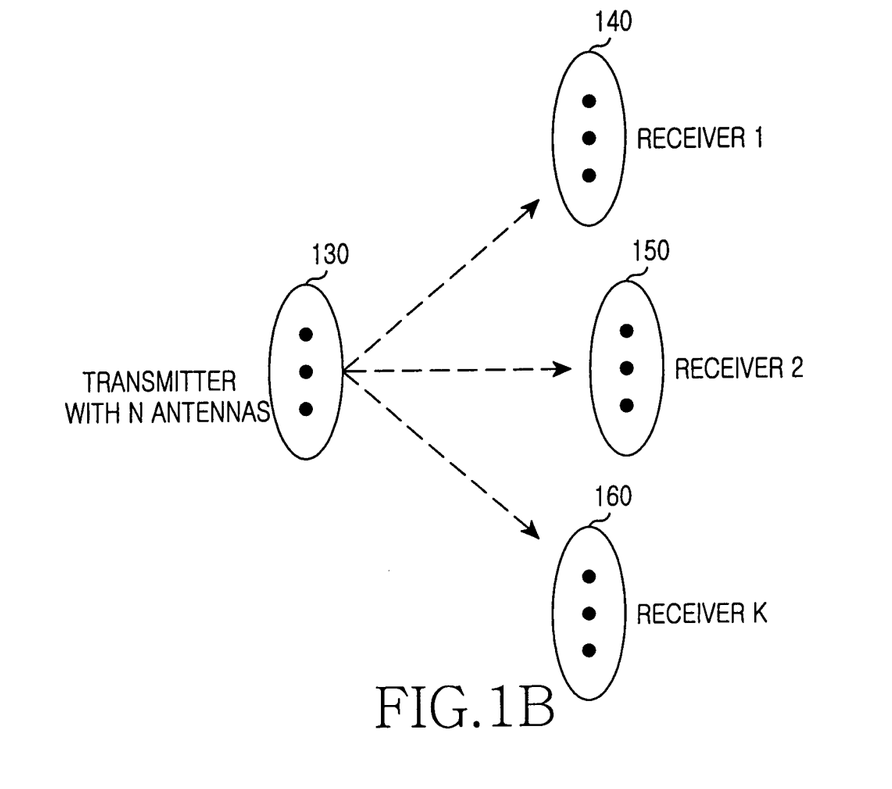
FIG. 1B illustrates a multi-user multi-antenna communication system having a transmitter with a plurality of transmit antennas and a plurality of receivers each having a plurality of receive antennas.

FIG. 1B illustrates a multi-user, multi-antenna communication system having a transmitter with a plurality of transmit antennas and a plurality of receivers each having a plurality of receive antennas. The multi-user, multi-antenna communication system allows a plurality of receivers (i.e., mobile stations) to access the same resources simultaneously so that independent data streams flow between the transmitter and the receivers. That is, a BS transmitter 130 communicates with a plurality of receivers 140, 150 and 160 each having a plurality of antennas.

In the multi-user, multi-antenna communication system, the transmitter applies beamforming weights to data that the receivers will receive. In this case, the transmitter should transmit pilot subcarriers with beamforming weights with respect to the respective receivers. However, if the transmitter does not have a sufficient number of pilot subcarriers for the receivers as with Institute of Electrical Electronics Engineers (IEEE) 802.16 Partial Usage of SubChannels (PUSC) in which one pilot is shared among a plurality of receivers, beamforming weights cannot be applied to pilot subcarriers. Since the receivers have different beamforming weights, the common use of pilot subcarriers with one beamforming weight at the receivers leads to inaccurate data detection.

Therefore, there exists a need for an apparatus and method for transmitting and receiving a signal that enable accurate data detection in the communication system in which the transmitter does not use a sufficient number of pilot subcarriers for the receivers. Also, there is a need for a subcarrier allocation structure that suits the transmission and reception apparatus and method.

Even though dedicated channels are available for a plurality of pilot subcarriers, the resulting overhead is overwhelming. Thus, there exists a need for an apparatus and method for transmitting and receiving a signal, and a subcarrier allocation structure suitable for the apparatus and method, which reduce the overhead from transmitting pilot subcarriers on dedicated channels and also enable channel estimation at a receiver even though a match filter for an effective channel is not an optimal receive filter.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention is to provide an apparatus and method for transmitting and receiving a signal that enable channel estimation for respective antennas of a receiver in the case where a transmitter does not transmit pilot subcarriers to the antennas of the receiver on dedicated channels—that is, in a communication system designed to share downlink pilot subcarriers among the antennas of the receiver—and a structure for allocating data subcarriers and pilot subcarriers to suit the apparatus and method.

Another aspect of the present invention is to provide an apparatus and method for transmitting and receiving a signal that enable channel estimation at a plurality of receivers in the case where a transmitter does not transmit a sufficient of pilot subcarriers to the receivers, and a structure for allocating data subcarriers and pilot subcarriers to suit the apparatus and method.

A further aspect of the present invention provides an apparatus and method for transmitting and receiving a signal that reduce overhead resulting from transmitting pilot subcarriers on dedicated channels, when the dedicated channels are available for the pilot subcarriers and enable channel estimation at a receiver, when a match filter for an effective channel is not an optimal receive filter, and a structure for allocating data subcarriers and pilot subcarriers to suit the apparatus and method.

In accordance with an aspect of exemplary embodiments of the present invention, there is provided a transmitter in a multi-user multi-antenna communication system, adapted to perform calculating receive filters for each of a plurality of receivers, determining the index of a vector having a correlation with the calculated receive filters in a preset codebook vector to be a receive filter index, and transmitting the receive filter index to the each receiver In accordance with another aspect of exemplary embodiments of the present invention, there is provided a transmitter in a communication system having a receiver with a plurality of antennas, adapted to perform calculating receive filters for a plurality of antennas in a receiver, determining the index of a vector having a correlation with the calculated receive filters in a preset codebook vector to be a receive filter index, and transmitting the receive filter index to the antennas of the receiver.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B respectively illustrate a conventional data and pilot subcarrier allocation structure and a data and pilot subcarrier allocation structure according to an embodiment of the present invention in an OFDMA communication system in which multi-user data is transmitted in one tile; and FIGS. 7A and 7B respectively illustrate the conventional data and pilot subcarrier allocation structure and a data and pilot subcarrier allocation structure according to another embodiment of the present invention in the OFDMA communication system in which multi-user data is transmitted in one tile.

DETAILED DESCRIPTION OF EMBODIMENTS THE INVENTION

FIGS. 2A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a transmission apparatus and method for calculating receive filters for respective antennas of a receiver or for each of a plurality of respective receivers, selecting a vector having the highest correlation with the calculated receive filters from a preset codebook, setting a receive filter index to the index of the selected vector, and transmitting the reception filter index to the receiver, and a reception apparatus and method for receiving a receive filter index and using a vector corresponding to the receive filter index in a preset codebook as receive filters. The present invention also provides a structure for allocating data subcarriers and pilot subcarriers, which suits the transmission apparatus and method and the reception apparatus and method.

The present invention is based on the premise that a transmitter has knowledge of the downlink channel status of a receiver in a communication system. When a channel changes slowly relative to a downlink and uplink frame duration, it can be said that the channel is constant over a few frames and has the same characteristics on the downlink and the uplink. In this case, a base station (BS) and users estimate the same channel. The base station can estimate all channel matrices between its transmitter and receivers using data or uplink sounding pilots received from the receivers. The channel estimation is performed in a known method.

The following description will be made in the context of a Time Division Duplexing (TDD) communication system in which a base station (BS) transmitter can acquire downlink channel information by estimating an uplink channel, by way of example.

The present invention is applied to the multi-antenna communication system illustrated in FIG. 1A in which a transmitter with a plurality of transmit antennas communicates with a receiver with a plurality of receive antennas, or the multi-user multi-antenna communication system illustrated in FIG. 1B in which a transmitter with a plurality of transmit antennas communicates with a plurality of receivers each having a plurality of receive antennas. Hereinbelow, the multi-user multi-antenna communication system is taken in the following description.

Figure 2A:
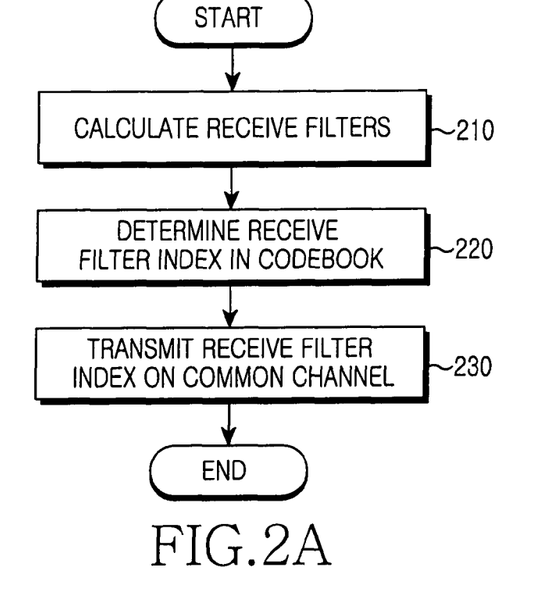
FIG. 2A is a flowchart of transmitting a receive filter index in a transmitter according to the present invention.

FIG. 2A is a flowchart of transmitting a receive filter index in a transmitter according to the present invention.

Referring to FIG. 2A, the transmitter calculates receive filters for each of a plurality of receivers in step 210. The receive filters calculation can be considered in two methods. One of the methods is that initial receive filters are set to a random unitary vector for each of K users (or mobile stations). The other method is to repeat Ni times for each of K users, a step for calculating an effective channel matrix using current receive filters, a step for calculating the pseudo-inverse matrix of the effective channel matrix using the current receive filters and a channel matrix, a step for updating current transmit filters to a normalized kth column of the inverse effective channel matrix, a step for generating receive filters by multiplying the channel matrix by the current transmission filters of the user, and a step for normalizing the product.

For details of the above methods and other calculation methods, see Korea Patent Application No. 2005-97720 and Korea Patent Application No. 10-2006-100667.

After calculating the receive filters, the transmitter searches for a vector having the highest correlation with the receive filters in a preset codebook and determines the index of the vector to be a receive filter index in step 220. The codebook is preferably a transmit filter codebook used in the communication system. The vector selection is performed in a known method.

An example of the codebook can be an IEEE 802.16e beamforming matrix codebook.

Table 1 below illustrates part of an IEEE 802.16e codebook.

TABLE 1

| Index | Column 1 | Column 2 |
|---|---|---|
| w1 | 0 | 0 |
|  | 1 | 0 |
|  | 0 | 1 |
| w2 | −0.7201+j0.3126 | 0.2483+j0.2684 |
|  | −0.2326 | 0.1898+j0.5419 |
|  | 0.1898−j0.5419 | 0.7325 |
| w3 | −0.0659−j0.1371 | −0.6283+j0.5763 |
|  | 0.9537 | 0.0752+j0.2483 |
|  | 0.0752−j0.2483 | −0.4537 |
| w4 | −0.0063−j0.6527 | 0.4621+j0.3321 |
|  | 0.1477 | 0.4394−j0.5991 |
|  | 0.4394+j0.5991 | 0.3522 |
| w5 | 0.7171−j0.3202 | −0.2533−j0.2626 |
|  | −0.2337 | 0.1951+j0.5390 |
|  | 0.1951−j0.5390 | 0.7337 |
| w6 | 0.4819+j0.4517 | 0.2963+j0.4801 |
|  | 0.1354 | −0.7127−j0.1933 |
|  | −0.7127+j0.1933 | 0.3692 |
| w7 | 0.0686+j0.1386 | 0.6200−j0.5845 |
|  | 0.9522 | 0.0770+j0.2521 |
|  | 0.0770−j0.2521 | −0.4522 |
| w8 | −0.0054+j0.6540 | −0.4566−j0.3374 |
|  | 0.1446 | 0.4363−j0.6009 |
|  | 0.4363+j0.6009 | 0.3554 |

In Table 1, Column 1 and Column 2 represent transmission streams and a row represents a transmit antenna in each w. Thus, in each w, first, second and third rows represent first, second and third antennas, respectively. That is, Table 1 illustrates a codebook for three transmit antennas, two transmission streams, and 3-bit feedback information. IEEE 802.16e defines a total of 19 different codebooks for two to four transmit antennas, one to four streams, and 3-bit to 6-bit feedback information.

In step 230, the index of the selected vector is transmitted as a receive filter index to the receiver on a common channel.

Figure 2B:
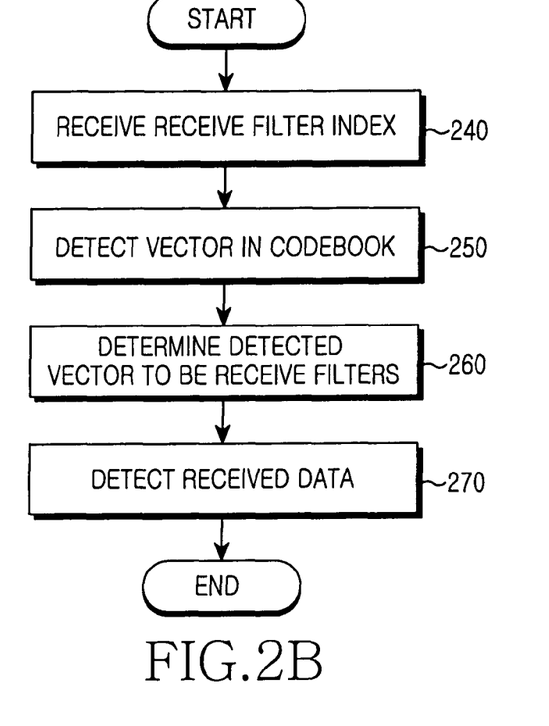
FIG. 2B is a flowchart of detecting data using a received receive filter index in a receiver according to the present invention.

FIG. 2B is a flowchart of detecting data using a received receive filter index in a receiver according to the present invention.

Referring to FIG. 2B, each receiver receives its receive filter index on a common channel from a transmitter in step 240 and detects a vector corresponding to the receive filter index in a preset codebook in step 250. In step 260, the receiver determines the detected vector to be receive filters. Then, the receiver detects data received from the transmitter using the receive filters in step 270.

Figure 3A:
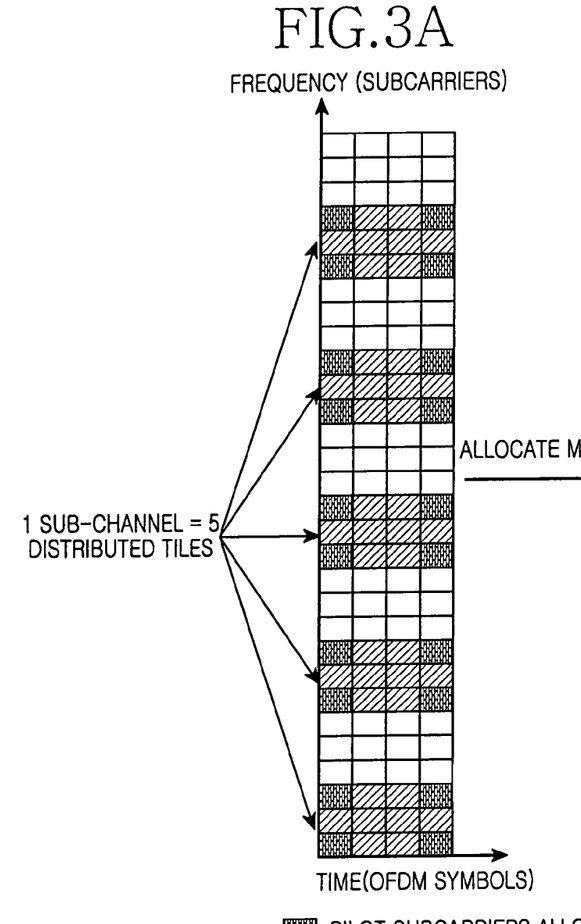
FIGS. 3A and 3B respectively illustrate a conventional data and pilot subcarrier allocation structure and a data and pilot subcarrier allocation structure according to an embodiment of the present invention in an Orthogonal Frequency Division Multiple Access (OFDMA) communication system.
Figure 3B:
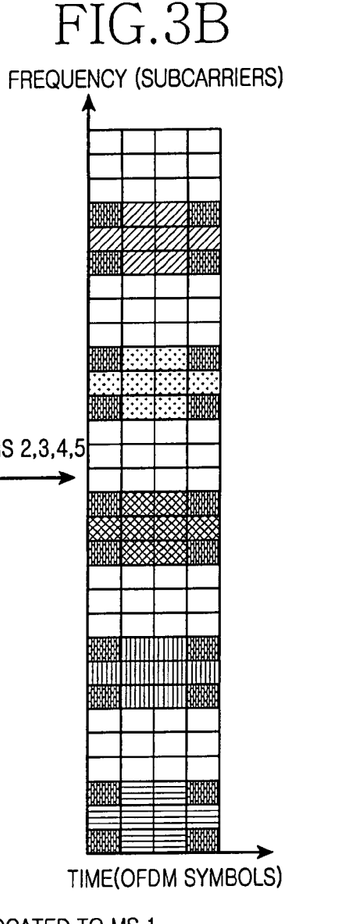

FIGS. 3A and 3B respectively illustrate a conventional data and pilot subcarrier allocation structure and a data and pilot subcarrier allocation structure according to an embodiment of the present invention in an OFDMA communication system.

Referring to FIG. 3A, conventionally, five tiles (i.e., five sets of subcarriers) include data subcarriers and dedicated pilot subcarriers for mobile station MS1. That is, data subcarriers can be transmitted to other mobile stations only when dedicated pilot subcarriers can be transmitted to them.

Referring to FIG. 3B, all pilot subcarriers are modulated with receive filters (i.e., beamforming weights) for mobile station MS1. In this case, the transmitter transmits receive filter (beamforming weight) indexes for other receivers in their data.

Figures 4A, 4B:
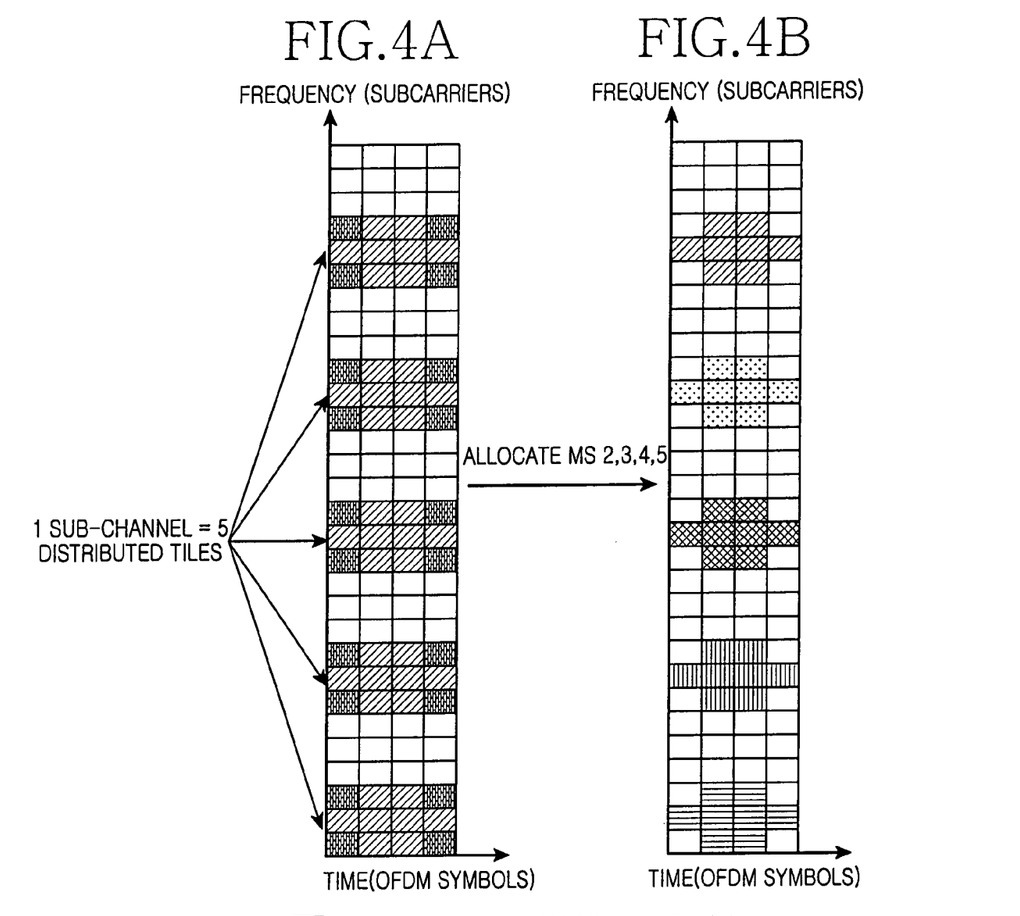
FIGS. 4A and 4B respectively illustrate the conventional data and pilot subcarrier allocation structure and a data and pilot subcarrier allocation structure according to another embodiment of the present invention in the OFDMA communication system.

FIGS. 4A and 4B respectively illustrate the conventional data and pilot subcarrier allocation structure and a data and pilot subcarrier allocation structure according to another embodiment of the present invention in the OFDMA communication system.

FIG. 4A is identical to FIG. 3A.

Referring to FIG. 4B, common pilot subcarriers reside at all pilot subcarrier positions. In this case, the transmitter transmits receive filter (beamforming weight) indexes for all receivers in their data.

Figure 5A:
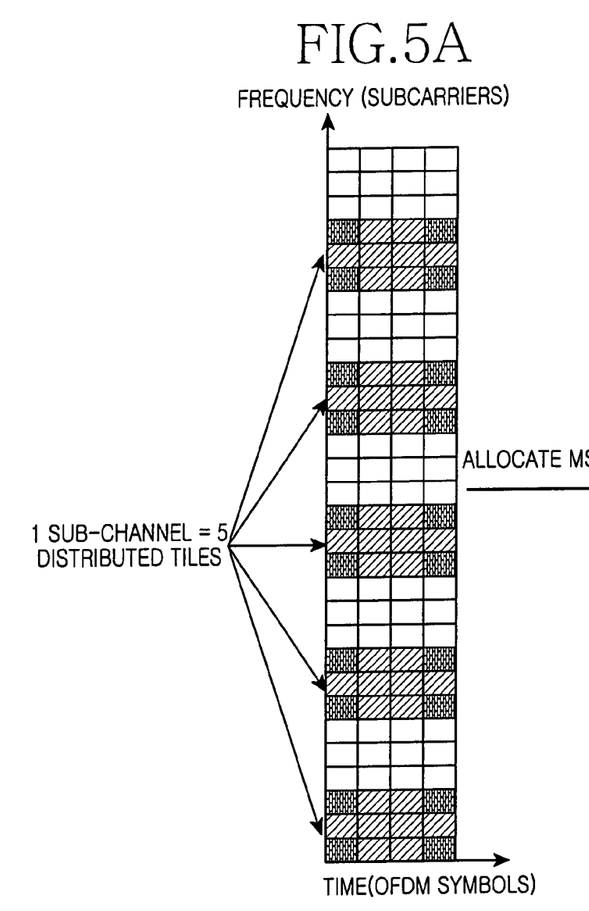
FIGS. 5A and 5B respectively illustrate the conventional data and pilot subcarrier allocation structure and a data and pilot subcarrier allocation structure according to a third embodiment of the present invention in the OFDMA communication system.
Figure 5B:
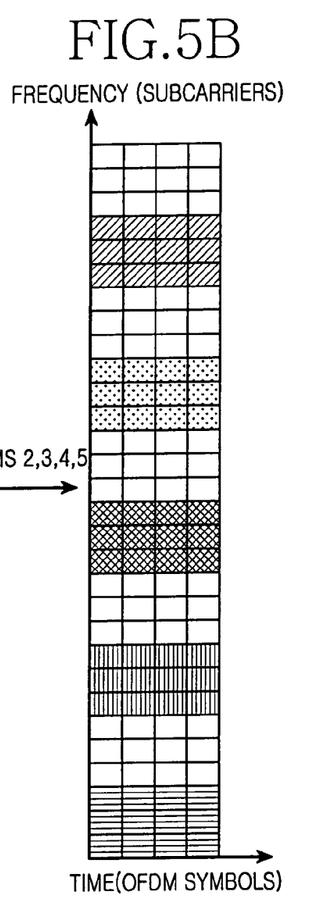

FIGS. 5A and 5B respectively illustrate the conventional data and pilot subcarrier allocation structure and a data and pilot subcarrier allocation structure according to a third embodiment of the present invention in the OFDMA communication system.

FIG. 5A is identical to FIG. 3A.

Referring to FIG. 5B, the conventional dedicated pilot subcarriers are replaced with data subcarriers. In this case, the transmitter transmits receive filter (beamforming weight) indexes for all receivers in their data.

Figure 6A:
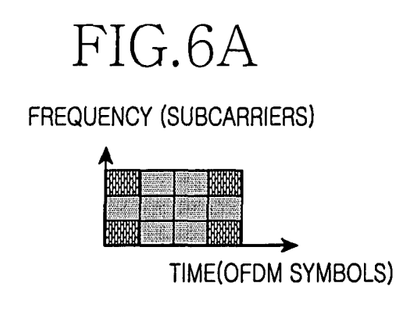

FIGS. 6A and 6B respectively illustrate a conventional data and pilot subcarrier allocation structure and a data and pilot subcarrier allocation structure according to an embodiment of the present invention in an OFDMA communication system in which multi-user data is transmitted in one tile.

Referring to FIG. 6A, conventionally, one tile (i.e., a set of subcarriers) includes dedicated pilot subcarriers for MS1 and data subcarriers for MS1 and MS2. In this case, dedicated pilot subcarriers cannot be transmitted to MS2.

Referring to FIG. 6B, the dedicated pilot subcarriers for MS1 are replaced with common pilot subcarriers and receive filter (beamforming weight) indexes for MS1 and MS2 are transmitted in their data.

Figure 7A:
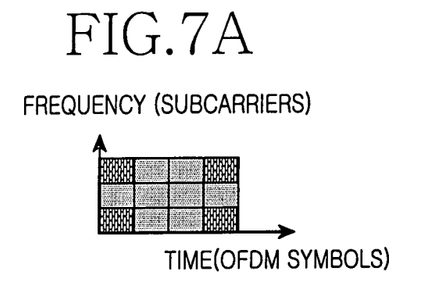

FIGS. 7A and 7B respectively illustrate a conventional data and pilot subcarrier allocation structure and a data and pilot subcarrier allocation structure according to another embodiment of the present invention in the OFDMA communication system in which multi-user data is transmitted in one tile.

FIG. 7A is identical to FIG. 6A.

Referring to FIG. 7B, the dedicated pilot subcarriers for MS1 are replaced with data subcarriers and receive filter (beamforming weight) indexes for MS1 and MS2 are transmitted in their data.

Figure 8:
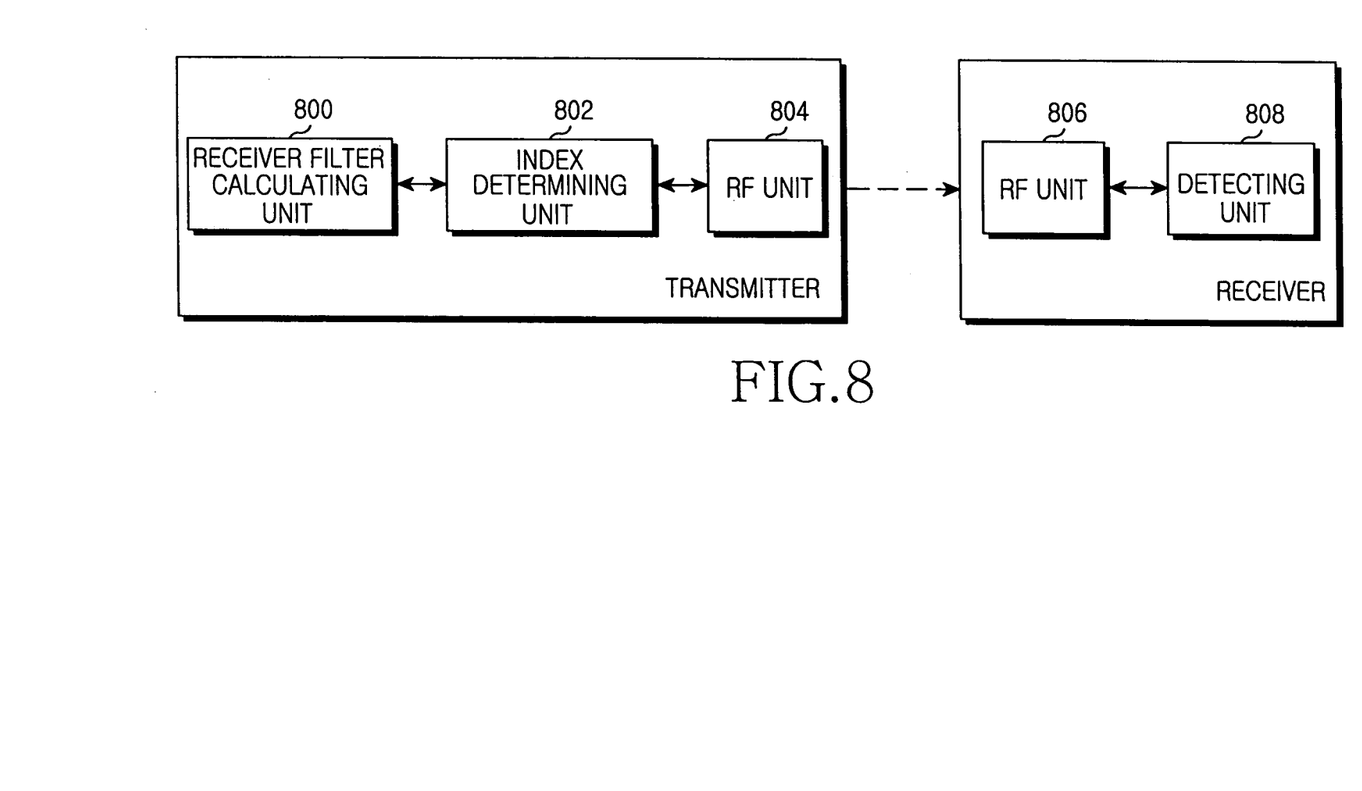
FIG. 8 is a block diagram of a transmitter and a receiver according to the present invention.

FIG. 8 is a block diagram of a transmitter and a receiver according to the present invention.

Referring to FIG. 8, a receiver filter calculating unit 800 of the transmitter calculates receive filters for a plurality of antennas in a receiver. The index determining unit 802 of the transmitter determines the index of a vector having a correlation with the calculated receive filters in a preset codebook vector to be a receive filter index. An RF unit 804 of the transmitter transmits the receive filter index to the antennas of the receiver.

The RF unit 806 of the receiver receives a receive filter index for the receiver from a transmitter. The detecting unit 808 of the receive searches for a vector corresponding to the receive filter index in a preset codebook, and detecting received data using the vector as receive filters.

As is apparent from the above description, in accordance with the present invention, a transmitter calculates receive filters for respective antennas of a receiver or for each of a plurality of receivers, selects a vector having the highest correlation with the calculated receive filters in a preset codebook, determines the index of the vector to be a receive filter index, and transmits the receive filter index to the receiver. The receiver searches for the vector corresponding to the received receive filter index in the preset codebook and detects received data using the receive filters. Therefore, each receiver can detect received data without the need for the transmitter's transmitting beamformed pilot signals on dedicated channels for the respective antennas of a receiver or for each of a plurality of receivers.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmitter of a first device in a multi-user multi-antenna communication system, the transmitter comprising:
   a receiver filter calculating unit configured to calculate receiving beamforming weights for each of a plurality of receivers of second devices;
   an index determining unit configured to determine a codebook index based on the calculated receiving beamforming weights for each of the plurality of receivers of second devices; and
   a radio frequency (RF) unit configured to transmit the codebook index for each of the plurality of receivers,
   wherein the transmitter is configured to transmit the codebook index for each of the plurality of receivers by one of:
      modulating all pilot subcarriers with the receiving beamforming weights of one of the plurality of receivers and including information related to the receiving beamforming weights for each of the other receivers in each data subcarrier for the other receivers, replacing common pilot subcarriers with dedicated pilot subcarriers and including information related to the receiving beamforming weights for the plurality of receivers in each of data subcarriers for the plurality of receivers, and
      replacing the data subcarriers with the dedicated pilot subcarriers and including information related to the receiving beamforming weights for the plurality of receivers in each of the data subcarriers for the plurality of receivers.

2. A receiver in a first device with a plurality of antennas in a communication system, the receiver comprising:
   a radio frequency (RF) unit configured to receive a codebook index for the respective antennas from a transmitter in a second device; and
   a detecting unit configured to search for receiving beamforming weights corresponding to the codebook index in a codebook, and detect received data using the receiving beamforming weights for the respective-antennas,
   wherein the RF unit is further configured to one of:
      apply the receiving beamforming weights of one receiver of a plurality of receivers to all pilot subcarriers, wherein information related to the receiving beamforming weights for each of the other receivers is included in each of data subcarriers for the other receivers;
      replace common pilot subcarriers with dedicated pilot subcarriers, wherein information related to the receiving beamforming weights for the plurality of receivers is included in each of data subcarriers for the plurality of receivers; and
      replace the data subcarriers with the dedicated pilot subcarriers, wherein the receiving beamforming weights for the plurality of receivers is included in each of the data subcarriers for the plurality of receivers.

3. A transmission method in a first device in a multi-user multi-antenna communication system, the method comprising:
   calculating receiving beamforming weights for each of a plurality of receivers of second devices;
   determining a codebook index based on the calculated receiving beamforming weights for each of the plurality of receivers of the second devices; and
   transmitting the codebook index for each of the plurality of receivers by one of:
      modulating all pilot subcarriers with the receiving beamforming weights of one receiver of the plurality of receivers and including information related to the receiving beamforming weights for each of the other receivers in each of data subcarriers for the other receivers,
      replacing the common pilot subcarriers with dedicated pilot subcarriers and including information related to the receiving beamforming weights for the plurality of receivers in each of the data subcarriers for the plurality of receivers, and
      replacing the data subcarriers with the dedicated pilot subcarriers and including information related to the receiving beamforming weights for the plurality of receivers in each of data subcarriers for the plurality of receivers.

4. A reception method in a first device with a plurality of antennas in a communication system, the method comprising:
   receiving a codebook index for the plurality of antennas from a transmitter in a second device, in partial usage of subchannels (PUSC) including dedicated pilot subcarriers, common pilot subcarriers, and data subcarriers; and
   searching for receiving beamforming weights corresponding to the codebook index in a codebook, and detecting received data using the receiving beamforming weights for the respective antennas,
   wherein one of:
      the receiving beamforming weights of one of a plurality of receivers is applied to all pilot subcarriers and information related to the receiving beamforming weights for each of the other receivers is included in each of data subcarriers for the other receivers;
      the codebook index for each of the plurality of receivers is received from the transmitter by replacing common pilot subcarriers with the dedicated pilot subcarriers and including information related to the receiving beamforming weights for the plurality of receivers in each of data subcarriers for the plurality of receivers; and
      the codebook index for each of the plurality of receivers is received from the transmitter by replacing the data subcarriers with the dedicated pilot subcarriers and including the receiving beamforming weights for the plurality of receivers in each of the data subcarriers for the plurality of receivers.

5. A transmitter for transmitting codebook information in a wireless communication system, the transmitter comprising:
a receiver filter calculating unit configured to calculate weights for each of a plurality of receivers;
an index determining unit configured to determine a codebook index for each of the plurality of receivers based on the corresponding calculated weight; and
a radio frequency (RF) unit configured to transmit a pilot subcarrier by applying a first codebook index to a first receiver of the plurality of receivers, and transmit information related to the remaining codebook indexes to the remaining receivers when no pilot subcarrier applies the remaining codebook indexes to be transmitted.

6. The transmitter of claim 5, wherein the information related to the remaining codebook indexes are transmitted using each of data subcarriers for the remaining receivers.

7. The transmitter of claim 5, wherein the RF unit is further configured to transmit the codebook index for each of the plurality of receivers by replacing common pilot subcarriers with dedicated pilot subcarriers and including information related to the weights for the plurality of receivers in each of data subcarriers for the plurality of receivers.

8. The transmitter of claim 5, wherein the RF unit is further configured to transmit the codebook index for each of the plurality of receivers by replacing data subcarriers with dedicated pilot subcarriers and including information related to the weights for the plurality of receivers in each of the data subcarriers for the plurality of receivers.

9. The transmitter of claim 5, wherein the wireless communication system is based on a multi-user multi-antenna communication system based on time-division duplexing (TDD).

10. The transmitter of claim 5, wherein the receiver filter calculating unit is further configured to calculate the weights for the plurality of receivers, by one of:
setting initial weights to a random unitary vector; and
calculating an effective channel matrix using the receive filters, calculating a pseudo-inverse matrix of the effective channel using the receive filters and a channel matrix, updating transmit filters to a normalized column of the inverse effective channel matrix, generating receive filters by multiplying the channel matrix by the transmission filters, and normalizing the product.

11. A receiver for receiving a codebook information in a wireless communication system, the receiver comprising:
a radio frequency (RF) unit configured to receive information related to a codebook index from a transmitter when there is no pilot subcarrier applying the codebook index, the codebook index determined for each of a plurality of receivers based on a corresponding calculated weight; and
a detecting unit configured to detect received data from the transmitter using the information related to the codebook index.

12. The receiver of claim 11, wherein the information related to the codebook index is received using data subcarriers for the receiver.

13. The receiver of claim 11, wherein the RF unit is further configured to receive the information related to the codebook index by replacing the common pilot subcarriers with dedicated pilot subcarriers and including information related to the weight in data subcarriers for the receiver.

14. The receiver of claim 11, wherein the RF unit is further configured to receive the codebook index for the receiver by replacing the data subcarriers with dedicated pilot subcarriers and including information related to the weight in data subcarriers for the receiver.

15. The receiver of claim 11, wherein the wireless communication system is based on a multi-user multi-antenna communication system based on time-division duplexing (TDD).

16. A method for transmitting a codebook information in a wireless communication system, the method comprising:
calculating weights for each of a plurality of receivers;
determining a codebook index based on the corresponding calculated weight for each of the plurality of receivers;
transmitting a pilot subcarrier by applying a first codebook index to a first receiver; and
transmitting information related to the remaining codebook indexes to the remaining receivers when there is no pilot subcarrier applying the remaining codebook indexes to be transmitted.

17. The method of claim 16, wherein the information related to the remaining codebook indexes are transmitted using each of data subcarriers for the remaining receivers.

18. The method of claim 16, wherein the codebook index for each of the plurality of receivers is transmitted by replacing common pilot subcarriers with dedicated pilot subcarriers and including information related to the weights for the plurality of receivers in each of data subcarriers for the plurality of receivers.

19. The method of claim 16, wherein the codebook index for each of the plurality of receivers is transmitted by replacing data subcarriers with dedicated pilot subcarriers and including information related to the weights for the plurality of receivers in each of data subcarriers for the plurality of receivers.

20. The method of claim 16, wherein the wireless communication system is based on a multi-user multi-antenna communication system based on time-division duplexing (TDD).

21. The method of claim 16, wherein the weight for each of the plurality of receivers is calculated by one of:
setting initial weights to a random unitary vector; and
calculating an effective channel matrix using the receive filters, calculating a pseudo-inverse matrix of the effective channel using the receive filters and a channel matrix, updating transmit filters to a normalized column of the inverse effective channel matrix, generating receive filters by multiplying the channel matrix by the transmission filters, and normalizing the product.

22. A method for receiving a codebook information in a wireless communication system, the method comprising:
receiving an information related to a codebook index from a transmitter when there is no pilot subcarrier applying the codebook index, the codebook index determined based on a corresponding calculated weight for each of a plurality of receivers; and
detecting received data from the transmitter using the information related to the codebook index.

23. The method of claim 22, wherein the information related to the codebook index is received using data subcarriers for a receiver.

24. The method of claim 22, wherein receiving the information related to a codebook index comprises:
replacing common pilot subcarriers with dedicated pilot subcarriers; and
including information related to the weight in data subcarriers for the receiver.

25. The receiver of claim 22, wherein receiving the information related to a codebook index comprises:

replacing data subcarriers with dedicated pilot subcarriers; and including the information related to the weight in the data subcarriers for the receiver.

26. The method of claim 22, wherein the wireless communication system is based on a multi-user multi-antenna communication system based on time-division duplexing (TDD).

\* \* \* \* \*